Patented Apr. 3, 1934

1,953,415

UNITED STATES PATENT OFFICE

1,953,415

CHLORINATED DIBENZANTHRONES

Max Albert Kunz, Mannheim, and Karl Koeberle and Erich Berthold, Ludwigshafen-on-the-Rhine, Germany, assignors to General Aniline Works, Inc., New York, N. Y., a corporation of Delaware No Drawing. Application June 4, 1931, Serial No. 542,200. In Germany June 7, 1930

8 Claims. (Cl. 260—61)

The present invention relates to chlorinated dibenzanthrones and process of producing same.

According to the U. S. Patent No. 1,169,404 vat dyestuffs which give rise to dyeings possessing greater fastness to the action of chlorine than that possessed by the grey coloring matters of this class known prior to the said patent are obtained by acting on nitro or amino derivatives of dibenzanthrone or isodibenzanthrone with one of the following reactable chlorides, namely aluminium chloride, antimony pentachloride, phosphorus trichloride and phosphorus pentachloride.

We have now found that very valuable vat dyestuffs giving violet, navy blue to dark blue dyeings and quite different from the products already mentioned and which are distinguished by special fastness to water, that is to say their dyeings do not assume a reddish tinge when spurted with water, are obtained by heating a nitrodibenzanthrone, preferably at temperatures above 90° C., in the absence of any inorganic liquid, that is to say in the absence of any diluent at all or preferably in an inert aromatic diluent or suspending agent, preferably such as have a boiling point above 100° C., with chlorine or agents supplying chlorine, preferably such as contain no ionizable hydrogen atom as is present, for example, in chlorosulphonic acid, in such a manner that the nitrogen content is reduced to at the most 0.5 per cent or even better that the products are practically free from nitrogen. Chlorbenzene, trichlorbenzene, nitrobenzene or mixtures thereof for instance may be employed as suspending agents. The exact temperature to be used depends on the specific chlorinating agent employed. The chlorination is best carried out by a treatment with chlorine in a boiling diluent. Moreover, the temperature at which chlorination is effected and the duration of the treatment depend on the purity of the nitrodibenzanthrone used besides the amount of chlorinating agent employed. The conditions of working should be the stronger the purer the nitrodibenzanthrone. As the chlorinating agents may be mentioned in addition to free chlorine, acid chlorides which supply chlorine such as sulphuryl chloride, benzotrichloride or benzoyl chloride or several of them, and these may be used simultaneously or in any sequence. If desired, the preparation of the nitrodibenzanthrone and the chlorine treatment according to the present invention may be carried out in one working operation, i. e. without isolating intermediate products. The reaction products are usually formed in good yields and in a pure state in the form of blue to violet crystalline powders. They dissolve in concentrated sulphuric acid to give a violet coloration, the solutions of their vats are blue to blue-green and the dyeings have very good properties as regards fastness, in particular they do not change to red when spotted with water. The new products dissolve in nitrobenzene, trichlorobenzene, quinoline and pyridine to give violet solutions showing a strong red fluorescence; in aniline they dissolve giving blue solutions with a slightly reddish tinge and with dimethylaniline they give violet solutions showing no fluorescence. Since the nitrodibenzanthrones contain a nitro group in the Bz 2-position, the chlorinated dibenzanthrones obtained according to our invention contain a chlorine atom in the said position and by this fact they are distinguished from the chlorodibenzanthrones hitherto obtained. The nitrogen content of the products is reduced to the upper limit given only when at least 3 atomic proportions have been introduced into 1 molecular proportion of the dibenzanthrone, and consequently our invention comprises only the production of chlorodibenzanthrones containing at least 3 atomic proportions of chlorine in each molecular proportion of dibenzanthrone. When increasing the amount of chlorine introduced into the dibenzanthrone the nitrogen content is still further diminished and the properties of the products are improved. The best results are obtained when introducing about 4 atomic proportions of chlorine, but the amount of chlorine in the dyestuffs may be considerably increased nevertheless chlorinated dibenzanthrones superior to those hitherto produced being obtained.

If by the chlorination process products having a higher average content of nitrogen than 0.5 per cent are obtained, those parts thereof as are practically free from nitrogen or have a nitrogen content of at the most 0.5 per cent may be separated by recrystallization, for example, from organic solvents, or from sulphuric acid in the form of the oxonium sulphates, or from a hydrosulphite vat in form of the alkali metal salts of the leuco compounds. When necessary, the crude products which are practically free from nitrogen or contain at the most 0.5 per cent of nitrogen, may also be purified by the usual methods, as for example by way of their oxonium salts, by crystallization, or vatting or by treatment with oxidizing agents, for example in the form of their pastes with alkali or alkaline earth metal hypochlorites. Furthermore, the leuco derivatives, as for example the leuco esters, are obtained therefrom in the usual manner.

When products having a high content of chlorine are produced by the process according to the present invention, the chlorine content may be diminished by the action of reducing agents in organic diluents in the presence of such metals any oxides of which are readily reduced to metals. Reducing agents of the said kind comprise, for example, hydroquinone, dioxindole, guanidine, farmamide, formic acid and in particular hydrozine and its derivatives. Metals which may be used for the said purpose are, for example, copper, nickel, cobalt and silver; oxides and salts of the said metals may be used as well. The reduction of the chlorine content is carried out in organic solvents, in particular such as have basic properties, for example, pyridine, collidine, quinoline, dialkylaniline and the like. This process of reducing the chlorine content is more particularly set forth in the copending application for the improvement in dehalogenation of cyclic halogen compounds, Ser. No. 466,577, filed July 8, 1930. By this dechlorination process at the same time a purification of the dyestuffs is effected.

The products according to the present invention may be used not only as dyestuffs but also as intermediate products for the preparation of other dyestuffs.

The following examples will further illustrate how this invention may be carried out in practice, but the invention is not restricted to these examples. The parts are by weight.

Example 1

100 parts of pure mono-nitrodibenzanthrone which is obtainable by nitrating pure dibenzanthrone in suspension in nitrobenzene at low temperatures and by subsequent purification by way of the oxonium salt according to the U. S. Patent No. 1,513,851, are heated to boiling in 500 parts of trichlorobenzene while stirring and leading in a vigorous current of chlorine until a sample withdrawn exhibits a chlorine content corresponding to about 4 atomic proportions according to analysis and yields pure navy blue dyeings, which is usually the case after several hours. The whole is then allowed to cool. The reaction product which separates in a crystalline form may be isolated by filtration by suction or distilling off the solvent, if desired under reduced pressure or with steam, or with steam under reduced pressure. It dissolves in concentrated sulphuric acid giving a violet coloration and yields navy blue dyeings of very good fastness especially of absolute fastness to chlorine and excellent fastness to water from a blue green vat on the vegetable fibre.

Similar reaction products are obtained by treating other nitrodibenzanthrones with chlorine in trichlorobenzene, as for example a nitrodibenzanthrone obtainable according to the U. S. Patent No. 796,393. Nitrobenzene may be used, for example, instead of trichlorbenzene as the suspending agent. Likewise, antimony or iodine or both, or other halogen transferrers may be employed.

If necessary the reaction product may be dissolved in concentrated sulphuric acid and separated and isolated as the oxonium sulphate by precipitation with water or dilute sulphuric acid in order to purify it. Similarly it may be purified by crystallization or vatting or by treatment of its aqueous paste with hypochlorite or other oxidizing agents.

Example 2

50 parts of nitrodibenzanthrone, obtained by nitrating pure dibenzanthrone, are boiled for several hours while stirring in 250 parts of benzoyl chloride. After adding 300 parts of trichlorbenzene the whole is heated to boiling while leading in chlorine gas until a sample withdrawn yields clear navy blue dyeings having a fastness to water practically free from objection. The whole is then allowed to cool and is worked up as described in Example 1. The product obtained in a very good yield has properties similar to those of the product described in Example 1.

The benzoyl chloride may be replaced by benzotrichloride. Similarly the chlorine may be replaced by agents supplying chlorine as for example by sulphuryl chloride.

In a corresponding manner a dark blue colored reaction product having excellent fastness to drops of water is obtained from dibenzanthrone by nitration in nitrobenzene with nitric acid and immediate subsequent treatment with chlorine.

Example 3

7 parts of nitrodibenzanthrone, obtainable by nitrating dibenzanthrone in chloracetic acid by means of nitric acid, are heated to boiling for about 10 hours in 28 parts of trichlorobenzene while passing a current of chlorine into the reaction mixture. After cooling the reaction mixture, the product, of which a very good yield is obtained, is filtered off and worked up in the usual manner. It is a dark violet powder containing between 1 and 1.2 per cent of nitrogen.

5 parts of the product are dissolved in 25 parts of sulphuric acid monohydrate and 3½ parts of water are then added to the solution. The oxonium sulphate which separates on cooling is filtered off, washed with a small amount of sulphuric acid of between 80 and 85 per cent strength and decomposed by means of water. The product thus obtained contains only traces of nitrogen and dyes the vegetable fibre from a green blue vat navy blue shades completely fast against spurting with water and substantially clearer and more fast to chlorine than the chlorination product containing nitrogen.

What we claim is:

1. A process for the manufacture of chlorodibenzanthrones, which comprises heating a nitrodibenzanthrone in the absence of any inorganic diluent with a chlorinating agent until the nitrogen content is reduced to at the most 0.5 per cent.

2. A process for the manufacture of chlorodibenzanthrones, which comprises heating a nitrodibenzanthrone in an inert aromatic diluting medium at a temperature above 90° C. with a chlorinating agent until the nitrogen content is reduced to at the most 0.5 per cent.

3. A process for the manufacture of chlorodibenzanthrones, which comprises heating a nitrodibenzanthrone in an inert aromatic diluting medium at a temperature above 90° C. with a chlorinating agent devoid of an ionizable hydrogen atom until the nitrogen content is reduced to at the most 0.5 per cent.

4. A process for the manufacture of chlorodibenzanthrones, which comprises heating a nitrodibenzanthrone in an inert aromatic diluting medium at a temperature above 90° C. with chlorine until the nitrogen content is reduced to at the most 0.5 per cent and at least 3 atomic proportions of chlorine have been introduced into the initial material.

5. A process for the manufacture of chlorodibenzanthrones, which comprises heating a nitrodibenzanthrone in trichlorobenzene to boiling while introducing chlorine until the nitrogen content is reduced to at the most 0.5 per cent and at least 3 atomic proportions of chlorine have been introduced into the initial material.

6. A process for the manufacture of chlorodibenzanthrones, which comprises heating a nitrodibenzanthrone in an inert aromatic diluting medium at a temperature above 90° C. with a chlorinating agent until the nitrogen content is materially reduced, and separating by recrystallization from the reaction product those parts as have a nitrogen content of at the most 0.5 per cent.

7. Dibenzanthrones containing at least 3 atoms of chlorine of which one atom is in the Bz 2-position, dissolving in concentrated sulphuric acid to give violet solutions, in nitrobenzene to give violet solutions showing a strong red fluorescence, in aniline to give blue solutions with a slightly reddish tinge, and dyeing cotton from a blue green vat violet to blue dyeings not changing when spurted with water.

8. Dibenzanthrone containing about 4 atoms of chlorine of which one atom is in the Bz 2-position, dissolving in concentrated sulphuric acid to give a violet solution, in nitrobenzene to give a violet solution showing a strong red fluorescence, in aniline to give a blue solution with a slightly reddish tinge, and dyeing cotton from a blue green vat navy blue shades fast to chlorine and not changing when spurted with water.

MAX ALBERT KUNZ.
KARL KOEBERLE.
ERICH BERTHOLD.